United States Patent
Sakai

(10) Patent No.: US 12,397,725 B2
(45) Date of Patent: Aug. 26, 2025

(54) WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Tatsuro Sakai, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 294 days.

(21) Appl. No.: 18/026,471

(22) PCT Filed: Jul. 30, 2021

(86) PCT No.: PCT/JP2021/028257
§ 371 (c)(1),
(2) Date: Jul. 17, 2023

(87) PCT Pub. No.: WO2022/070582
PCT Pub. Date: Apr. 7, 2022

(65) Prior Publication Data
US 2023/0406238 A1 Dec. 21, 2023

(30) Foreign Application Priority Data
Sep. 29, 2020 (JP) .................. 2020-163517

(51) Int. Cl.
*B60R 16/02* (2006.01)
*H01B 7/08* (2006.01)
*H01B 7/40* (2006.01)

(52) U.S. Cl.
CPC ...... *B60R 16/0215* (2013.01); *B60R 16/0207* (2013.01); *H01B 7/08* (2013.01); *H01B 7/0823* (2013.01); *H01B 7/40* (2013.01)

(58) Field of Classification Search
CPC ................ H01B 7/08–0846; H01B 7/0823; H01B 7/40; B60R 16/0215
(Continued)

(56) References Cited

U.S. PATENT DOCUMENTS 4,783,579 A * 11/1988 Brandolf ............ B29C 48/12
174/120 SR
10,002,691 B1 * 6/2018 Salz .................... H01B 7/0823

FOREIGN PATENT DOCUMENTS

| JP | 2005-302439 A | 10/2005 |
| JP | 2009-140612 A | 6/2009 |
| JP | 2014-107917 A | 6/2014 |

OTHER PUBLICATIONS

International Search Report issued on Oct. 5, 2021 for WO 2022/070582 A1 (4 pages).

* cited by examiner

*Primary Examiner* — Paresh Paghadal
(74) *Attorney, Agent, or Firm* — Venjuris, P.C.

(57) ABSTRACT

The purpose of the present invention is to provide a wire harness that can easily bend along a routing path. A wire harness (10) comprises: two electric wires (20) each having a core wire (21) and an insulating coating part (22) that coats the outer periphery of the core wire (21); and a joining part (23) that joins the coating parts (22) with each other in a condition in which the two electric wires (20) are parallel. The joining part (23) joins with each other the portions of the coating parts (22) of the two electric wires (20) that cover end parts in the width direction of the core wires (21), and is configured so as to be capable of bending deformation (Continued)

between a first attitude in which the core wires (21) of the two electric wires are parallel in the mutual width direction thereof, and a second attitude in which the core wires (21) of the two electric wires (20) are parallel in the mutual thickness direction thereof. The wire harness (10) has a first bending part in which the two electric wires (20) are bent in the thickness direction in the first attitude, and a second bending part in which the two electric wires (20) are bent in the thickness direction in the second attitude.

6 Claims, 4 Drawing Sheets

(58) Field of Classification Search
USPC .......................................... 174/117 F, 117 FF
See application file for complete search history.

WIRE HARNESS

CROSS REFERENCE TO RELATED APPLICATIONS

This application is a national phase of PCT application No. PCT/JP2021/028257, filed on 30 Jul. 2021, which claims priority from Japanese patent application No. 2020-163517, filed on 29 Sep. 2020, all of which are incorporated herein by reference.

TECHNICAL FIELD

The present disclosure relates to a wire harness.

BACKGROUND ART

Conventionally, a wire harnesses that electrically connects a plurality of electrical devices to each other is routed under the floor of a vehicle (see Patent Document 1, for example). The wire harness disclosed in Patent Document 1 includes a plurality of electric wires arranged in parallel. The electric wires each include a core wire having a circular cross-section orthogonal to the longitudinal direction.

The wire harness includes a part extending in a straight line in a front-rear direction of the vehicle under the floor, a part that is bent in a vehicle width direction from the straight part, and a part that is bent in an up-down direction from the straight part. In the parts where the wire harness is bent, the core wire is bent so as to be plastically deformed. As a result, the shape of the wire harness is maintained in a state along the routing path.

PRIOR ART DOCUMENT

Patent Document

Patent Document 1: JP 2009-140612A

SUMMARY OF THE INVENTION

Problem to be Solved

Here, it is preferable that the part of the wire harness routed under the floor has a small size in the up-down direction. For this reason, in the wire harness, an electric wire having a core wire with a small size in the up-down direction may be used. Examples of such a shape of the cross-section of the core wire orthogonal to the longitudinal direction include a flattened shape in which the dimension in the thickness direction is smaller than the dimension in the width direction. However, in this case, it is easy to bend the core wire in the thickness direction, but it may be difficult to bend the core wire in the width direction.

In the routing path of the wire harness, the direction in which the core wire is bent differs between a part that is bent in the vehicle width direction and a part that is bent in the up-down direction. Accordingly, in a wire harness that includes a core wire having a flattened cross-sectional shape, the core wire is bent in both the thickness direction and the width direction. In this case, it may be difficult to bend the wire harness along the routing path.

An object of the present disclosure is to provide a wire harness that can be easily bent along a routing path.

Means to Solve the Problem

A wire harness according to the present disclosure includes: two electric wires each including a core wire and an insulating covering portion that covers an outer circumference of the core wire; and a coupling portion that couples the covering portions to each other while the two electric wires are arranged in parallel, wherein a cross-sectional shape of each of the core wires orthogonal to a longitudinal direction is a flat shape in which a dimension in a thickness direction is smaller than a dimension in a width direction, the coupling portion couples parts of the covering portions of the two electric wires that cover end portions of the core wires positioned in the width direction, and is configured to be bendable between a first form in which the core wires of the two electric wires are parallel to each other in the width direction and a second form in which the core wires of the two electric wires are parallel to each other in the thickness direction, a form of the two electric wires is switched between the first form and the second form with the coupling portion as a starting point, and the wire harness includes a first bending portion in which the two electric wires are bent in the thickness direction in the first form and a second bending portion in which the two electric wires are bent in the thickness direction in the second form.

Effect of the Invention

According to the present disclosure, it is possible to easily bend a wire harness along a routing path.

DETAILED DESCRIPTION TO EXECUTE THE INVENTION

Figure 1:
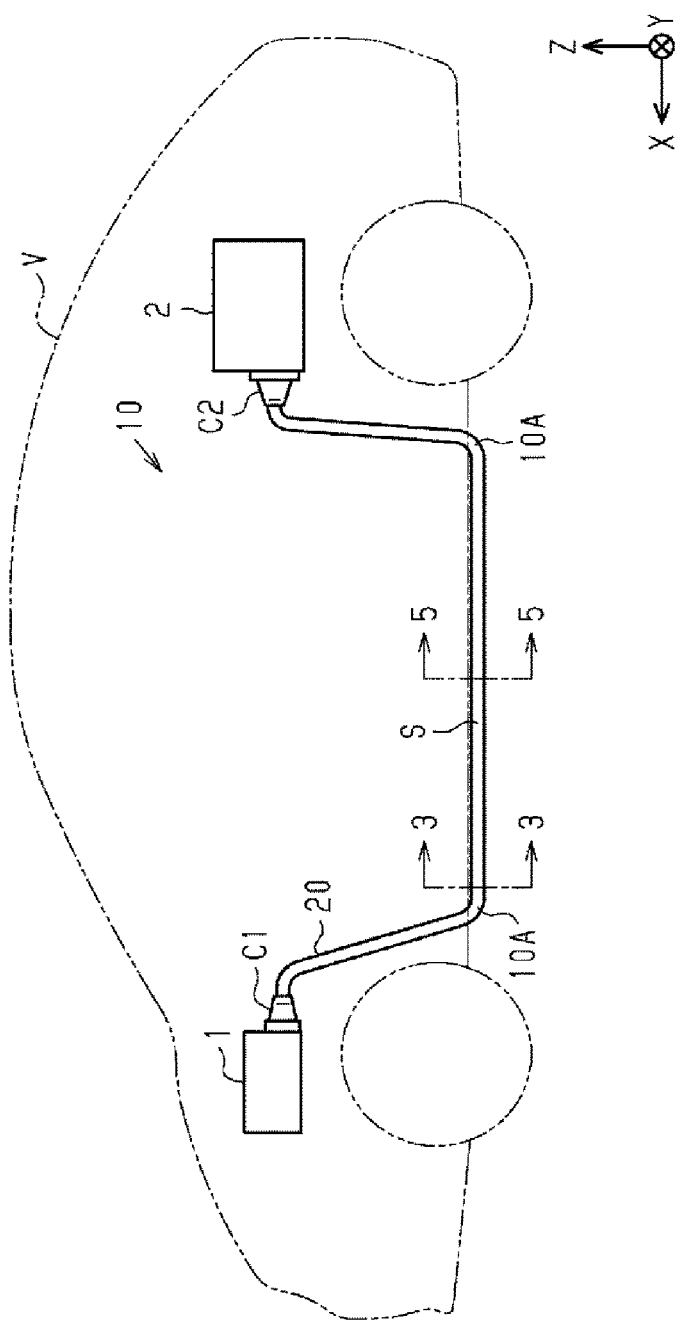
FIG. 1 is a schematic diagram illustrating a vehicle in which a wire harness according to an embodiment is routed.

Description of Embodiments of the Present Disclosure

First, embodiments of the present disclosure will be listed and described.

[1] A wire harness according to the present disclosure includes: two electric wires each including a core wire and an insulating covering portion that covers an outer circumference of the core wire; and a coupling portion that couples the covering portions to each other while the two electric wires are arranged in parallel, wherein a cross-sectional shape of each of the core wires orthogonal to a longitudinal direction is a flat shape in which a dimension in a thickness direction is smaller than a dimension in a width direction, the coupling portion couples parts of the covering portions of the two electric wires that cover end portions of the core wires positioned in the width direction, and is configured to be bendable between a first form in which the core wires of the two electric wires are parallel to each other in the width direction and a second form in which the core wires of the two electric wires are parallel to each other in the thickness direction, a form of the two electric wires is switched between the first form and the second form with the coupling portion as a starting point, and the wire harness includes a first bending portion in which the two electric wires are bent in the thickness direction in the first form and a second bending portion in which the two electric wires are bent in the thickness direction in the second form.

According to this configuration, by bending and deforming the coupling portion, the form of the two electric wires coupled via the coupling portion can be switched between the first form in which the core wires are arranged in parallel with each other in the width direction and the second form in which the core wires are arranged in parallel with each other in the thickness direction. Accordingly, the wire harness can be easily bent along the routing path by, for example, applying the first bending portion to a part of the wiring path of the wire harness that is to be bent in the up-down direction and applying the second bending portion to a part of the wiring path of the wire harness that is to be bent in the vehicle width direction.

[2] It is preferable that axes of the core wires extending in the thickness direction are parallel to each other in both the first form and the second form.

According to this configuration, in the first form, the core wires of the two electric wires are arranged side by side and parallel to each other in the width direction. Accordingly, it is easy to collectively bend the two electric wires in the thickness direction in the first bending portion. Also, in the second form, the core wires of the two electric wires are arranged side by side and parallel to each other in the thickness direction. Accordingly, it is easy to collectively bend the two electric wires in the thickness direction in the second bending portion. Therefore, the wire harness can be more easily bent along the routing path.

[3] It is preferable that in a case where a form of intermediate portions of the two electric wires in which the form of the two electric wires is switched between the first form and the second form with the coupling portion as a starting point is set as a third form, the form of the two electric wires is the third form while no bending load acts on the coupling portion, and the wire harness has a section in which the form of the two electric wires between the first bending portion and the second bending portion is the third form.

According to this configuration, the form of the two electric wires is the third form while no bending load is applied to the coupling portion. The third form is a form that appears at a midpoint during the switching of the form of the two electric wires between the first form and the second form with the coupling portion as a starting point. For this reason, it is possible to reduce the amount of deformation of the coupling portion during switching from the third form to the first form, and to reduce the amount of deformation of the coupling portion during switching from the third form to the second form. Accordingly, it is possible to suppress concentration of stress on the coupling portion.

Also, the wire harness has a section in which the two electric wires are in the third form between the first bending portion and the second bending portion. For this reason, it is possible to suppress sharp deformation of the two electric wires from the first bending portion to the second bending portion. Accordingly, it is possible to suppress concentration of stress on the electric wires.

[4] It is preferable that the coupling portion has a fragile portion serving as a starting point from which the coupling portion is bent and deformed.

According to this configuration, because the coupling portion is easily bent and deformed with the weak portion as a starting point, the work of switching the form of the two electric wires between the first form and the second form becomes easy.

Further, at the first bending portion and the second bending portion, the coupling portion is bent together with the two electric wires. Therefore, the work of collectively bending the two electric wires in the first bending portion and the work of collectively bending the two electric wires in the second bending portion are facilitated.

[5] It is preferable that the coupling portion includes a thin portion having a thickness smaller than a thickness of the electric wires, and the weak portion is constituted by the thin portion.

According to this configuration, the weak portion can be easily embodied by devising the shape of the coupling portion.

[6] It is preferable that the covering portions and the coupling portion are integrally made of the same resin material.

According to this configuration, the configuration of the wire harness is simplified.

Details of Embodiments of the Present Disclosure

A specific example of a wire harness according to the present disclosure will be described below with reference to the drawings. In the drawings, a part of a configuration may be exaggerated or simplified for convenience of description. In addition, dimensional ratios of the components may be different in the drawings. It should be noted that the present disclosure is not limited to these examples, but is defined by the scope of the claims and is intended to include all modifications within the meaning and scope equivalent to the scope of the claims. "Parallel" and "orthogonal" in the present specification include not only strictly parallel and orthogonal but also substantially parallel and orthogonal within a range in which the operation and effect of the present embodiment are exhibited.

Overall Configuration of Wire Harness 10

Figure 2:
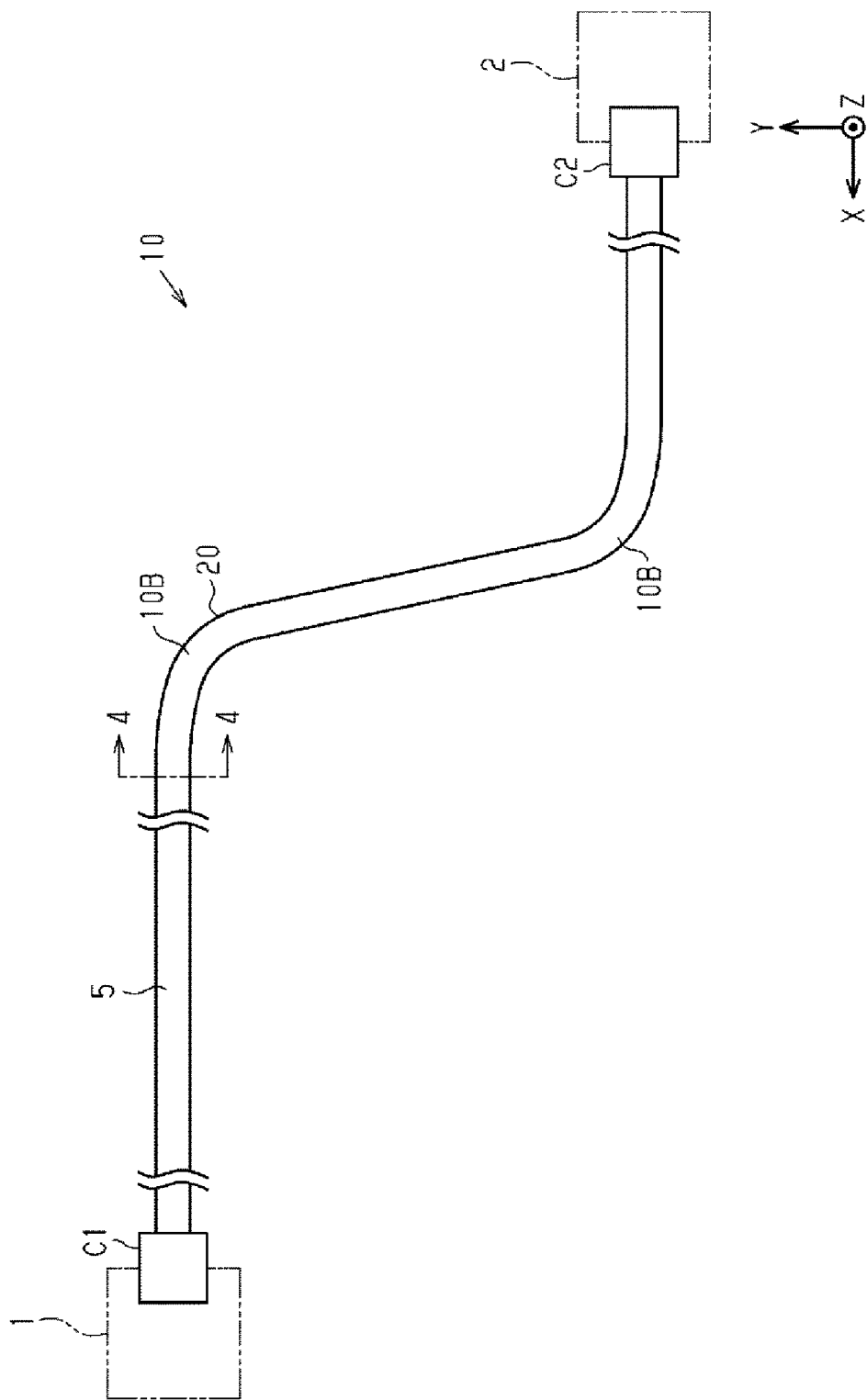
FIG. 2 is a plan view of the wire harness.

A wire harness 10 shown in FIGS. 1 and 2 electrically connects two or three or more electrical devices. The wire harness 10 electrically connects, for example, an inverter 1 installed in a front part of a vehicle V such as a hybrid vehicle or an electric vehicle to a high-voltage battery 2 installed behind the inverter 1 in the vehicle V. The wire harness 10 is routed so as to pass under the floor of the vehicle V, for example. An intermediate part of the wire harness 10 in the longitudinal direction is routed so as to pass under the floor of the vehicle V, which is outside the vehicle cabin, for example.

The inverter 1 is connected to a motor (not shown) for driving wheels, which is a power source for driving the vehicle. The inverter 1 generates AC power from DC power from the high-voltage battery 2, and supplies the AC power to the motor. The high-voltage battery 2 is, for example, a battery capable of supplying a voltage of several hundred volts.

The wire harness 10 includes two electric wires 20 arranged in parallel. Connectors C1 and C2 are attached to the two ends of the two electric wires 20, respectively. The ends of the electric wires 20 on one side are connected to the inverter 1 via the same connector C1, and the ends of the electric wires 20 on the other side are connected to the high-voltage battery 2 via the same connector C2. Note that the electric wires 20 may not be connected to the same electric device.

Here, the left-right direction in FIG. 1 is the front-rear direction of the vehicle, the up-down direction in FIG. 2 is the width direction of the vehicle, and the up-down direction in FIG. 1 is the up-down direction of the vehicle. In the following description, for convenience, a direction extending in the front-rear direction of the vehicle is referred to as an X-axis direction, a direction extending in the width direction of the vehicle is referred to as a Y-axis direction, and a direction extending in the up-down direction of the vehicle is referred to as a Z-axis direction.

Configuration of Electric Wires 20

The electric wires 20 extend while being three dimensionally bent in the X-axis direction, the Y-axis direction, and the Z-axis direction. The electric wires 20 are, for example, high-voltage electric wires capable of handling a high voltage and a large current. The electric wires 20 may be non-shielded electric wires having no electromagnetic shielding structure, or may also be shielded electric wires having an electromagnetic shielding structure.

The two electric wires 20 are fixed to the vehicle body by, for example, a plurality of clamps (not shown).

The outer circumferential surfaces of the two electric wires 20 are covered with, for example, a cylindrical exterior member (not shown). The exterior member is provided, for example, so as to cover the outer circumferential surfaces of a part of the electric wires 20 in the longitudinal direction. Examples of the exterior member include a corrugated tube having a bellows structure in which annular protruding portions and annular recessed portions are alternately arranged along the longitudinal direction of the exterior member.

Figure 3:
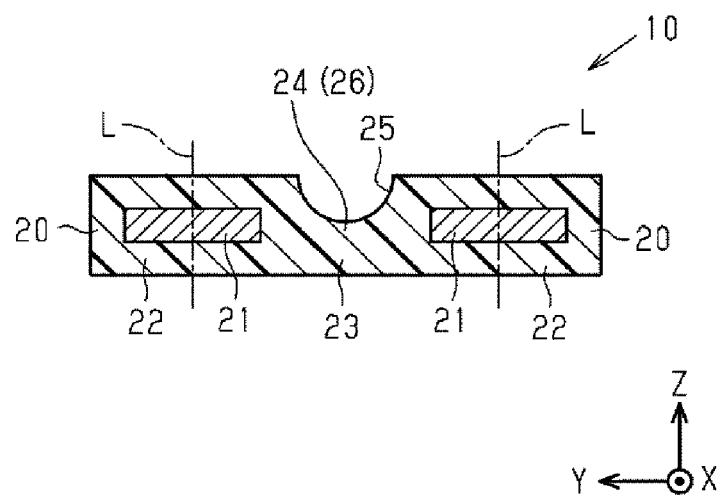
FIG. 3 is a cross-sectional view taken along line 3-3 of FIG. 1.

As shown in FIG. 3, the electric wires 20 each include a core wire 21 made of a conductor and an insulating covering portion 22 covering the outer circumferential surface of the core wire 21.

Configuration of Core Wires 21

The core wires 21 may each be, for example, a stranded wire formed by twisting a plurality of metal element wires, a columnar conductor (a single core wire, a bus bar, or the like) made of one columnar metal rod having a solid inner structure, a tubular conductor (a pipe conductor) having a hollow inner structure, or the like. The core wires 21 are each constituted by a stranded wire, for example. As a material of the core wires 21, for example, a metal material such as a copper-based material or an aluminum-based material can be used. The core wires 21 are formed by extrusion molding, for example.

The cross-sectional shape of core wires 21, that is, the shape of a cross-section orthogonal to the longitudinal direction of the core wires 21 is a flattened shape in which the dimension in the thickness direction is smaller than the dimension in the width direction. The core wires 21 are formed such that, for example, a stranded wire having a circular cross-section is compressed by a die or the like to have a flattened cross-sectional shape. In the present specification, "flattened shape" includes a rectangular shape, an oval shape, an elliptical shape, and the like. As used herein, the term "rectangular shape" refers to a shape having a long side and a short side, and excludes a square shape. In addition, "rectangular shape" in the present specification also includes a shape with chamfered edges and a shape with rounded edges.

The cross-sectional shape of each core wire 21 is, for example, a rectangular shape having a long side and a short side. The cross-sectional shape of each core wire 21 is, for example, the same over the entirety of the core wire 21 in the longitudinal direction.

Configuration of Covering Portions 22

The covering portions 22 cover, for example, the outer circumferential surfaces of the respective core wires 21 in an intimate contact state over the entire circumference. The outer circumferential surface of the covering portion 22 is shaped so as to extend along the outer circumferential surface of the core wire 21, for example. The cross-sectional shape of the covering portions 22 is, for example, an annular shape in which the outer circumferential edge and the inner circumferential edge form a rectangular shape. The covering portions 22 are made of, for example, an insulating material such as a synthetic resin. The covering portions 22 can be formed by performing extrusion molding on the core wires 21, for example.

Configuration of Coupling Portion 23

The wire harness 10 includes a coupling portion 23 that couples the covering portions 22 to each other while the two electric wires 20 are arranged in parallel. The coupling portion 23 couples parts of the covering portions 22 of the two electric wires 20 that cover the end portions of the core wires 21 in the width direction.

The covering portions 22 and the coupling portion 23 are integrally molded using the same resin material. The covering portions 22 and the coupling portion 23 are formed by performing extrusion molding on the two core wires 21, for example. The coupling portion 23 is configured to be elastically bendable.

The coupling portion 23 has a thin portion 24 having a thickness smaller than that of the electric wires 20. The thin portion 24 is formed by, for example, providing a recessed portion 25 on one outer surface of the coupling portion 23 in the thickness direction. The recessed portion 25 has an arc shape in a front view orthogonal to the longitudinal direction of the electric wires 20. The recessed portion 25 extends over the entire length of the electric wires 20 in the longitudinal direction. Accordingly, the thin portion 24 is provided over the entire length of the electric wires 20 in the longitudinal direction.

The coupling portion 23 has a weak portion 26 serving as a starting point at which the coupling portion 23 is bent and deformed. The bending rigidity of the weak portion 26 is smaller than that of the electric wires 20. For this reason, the weak portion 26 is more likely to be bent and deformed than other portions of the wire harness 10. The weak portion 26 is constituted by the thin portion 24, for example.

Figure 4:
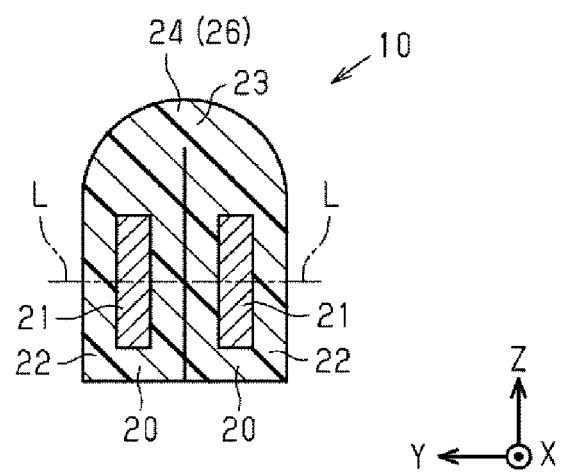
FIG. 4 is a cross-sectional view taken along line 4-4 of FIG. 2.
Figure 5:
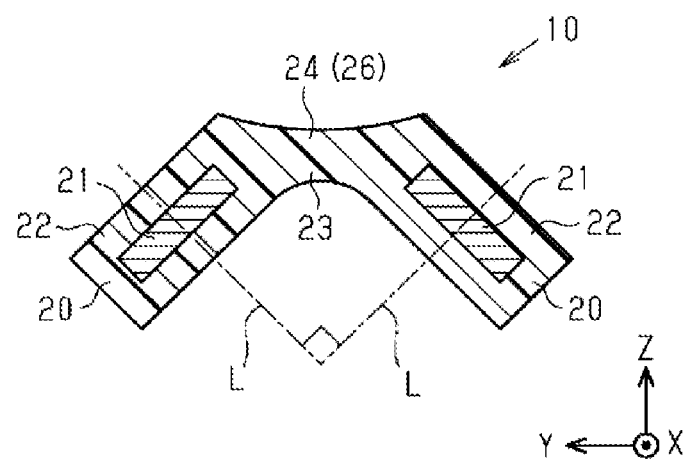
FIG. 5 is a cross-sectional view taken along line 5-5 of FIG. 1.

As shown in FIGS. 3 to 5, in the wire harness 10, when the coupling portion 23 is bent and deformed, the form of the two electric wires 20 coupled to each other by the coupling portion 23 is switched between a first form, a second form, and a third form. In other words, the coupling portion 23 is configured to be bendable between the first form, the second form, and the third form.

As shown in FIG. 3, the first form is a form in which the core wires 21 of the two electric wires 20 are parallel to each other in the width direction. In the first form, axes L extending in the thickness direction of the core wires 21 are parallel to each other.

As shown in FIG. 4, the second form is a form in which the core wires 21 of the two electric wires 20 are parallel to each other in the thickness direction. The second form is a form in which the two core wires 21 become parallel to each other in the thickness direction by the form of the two electric wires 20 in the first form being switched with the coupling portion 23 as a starting point. In the second form, for example, the coupling portion 23 is bent and deformed such that a part of the coupling portion 23 provided with the recessed portion 25 is on the outer circumferential side. In the second form, for example, the covering portions 22 of the two electric wires 20 are in contact with each other in the thickness direction. In the second form, the axes L extending in the thickness direction of the core wires 21 are parallel to each other.

Here, "the axes L are parallel to each other" in this specification includes a case where the two axes L are separated from each other and a case where the two axes L coincide with each other. In the second form shown in FIG. 4, the two axes L coincide with each other.

As shown in FIG. 5, the third form is a form that appears at a midpoint during the switching of the form of the two electric wires 20 between the first form and the second form with the coupling portion 23 as a starting point. In the third form, the two axes L intersect with each other. The angle formed by the two axes L in the third form is a right angle. Accordingly, the cross-sectional shape of the wire harness 10 in the third form is an L shape as a whole.

While no bending load is applied to the coupling portion 23, the form of the two electric wires 20 is the third form. That is to say, in the wire harness 10, the covering portions 22 and the coupling portion 23 are integrally molded such that the form of the two electric wires 20 is the third form.
Configuration of Wire Harness 10

As shown in FIGS. 1 and 2, the wire harness 10 includes a first bending portion 10A in which the two electric wires 20 are bent in the thickness direction in the first form and a second bending portion 10B in which the two electric wires 20 are bent in the thickness direction in the second form.

The first bending portion 10A is, for example, a part of the routing path of the wire harness 10 that is bent in the Z-axis direction from a part routed under the floor of the vehicle V toward the inside of the cabin. In the first bending portion 10A, the two electric wires 20 and the coupling portion 23 are both bent in the thickness direction while the width direction of the core wires 21 coincides with the Y-axis direction.

The second bending portion 10B is, for example, a part that is bent in the Y-axis direction from a part extending in the X-axis direction in the routing path of the wire harness 10. The second bending portion 10B is provided in a part of the routing path of the wire harness 10 that is routed under the floor of the vehicle V, for example. In the second bending portion 10B, the two electric wires 20 and the coupling portion 23 are both bent in the thickness direction while the width direction of the core wires 21 coincides with the Z-axis direction.

The wire harness 10 has a section S in which the form of the two electric wires 20 is the third form. The section S is provided in a part of the wire harness 10 between the first bending portion 10A and the second bending portion 10B. The section S is provided in a part of the routing path of the wire harness 10 that is routed under the floor of the vehicle V, for example. In the section S, the distance between the two electric wires 20 in the Y-axis direction increases as the electric wires 20 extend downward in the Z-axis direction, for example.

The functions of the present embodiment will be described.

By bending and deforming the coupling portion 23, the form of the two electric wires 20 coupled via the coupling portion 23 can be switched between the first form and the second form. In the first bending portion 10A where the wire harness 10 is bent in the Z-axis direction, the two electric wires 20 are bent in the thickness direction in the first form. In the second bending portion 10B where the wire harness 10 is bent in the Y-axis direction, the two electric wires 20 are bent in the thickness direction in the second form.

Effects of the present embodiment will be described below.

(1) The coupling portion 23 couples the parts of the covering portions 22 of the two electric wires 20 that cover end portions of the core wires 21 in the width direction, and is configured to be bendable between the first form in which the core wires 21 of the two electric wires 20 are parallel to each other in the width direction and the second form in which the core wires 21 of the two electric wires 20 are parallel to each other in the thickness direction. The wire harness 10 includes the first bending portion 10A in which the two electric wires 20 are bent in the thickness direction in the first form and the second bending portion 10B in which the two electric wires 20 are bent in the thickness direction in the second form.

According to such a configuration, because the above-described action is achieved, the wire harness 10 can be easily bent along the routing path.

(2) In both the first form and the second form, the axes L extending in the thickness direction of the core wires 21 are parallel to each other.

According to this configuration, in the first form, the core wires 21 of the two electric wires 20 are arranged side by side and parallel to each other in the width direction. Accordingly, it is easy to collectively bend the two electric wires 20 in the thickness direction in the first bending portion 10A. Also, in the second form, the core wires 21 of the two electric wires 20 are arranged side by side and parallel to each other in the thickness direction. Accordingly, it is easy to collectively bend the two electric wires 20 in the thickness direction in the second bending portion 10B. Therefore, the wire harness 10 can be more easily bent along the routing path.

(3) While no bending load is applied to the coupling portion 23, the form of the two electric wires 20 is the third form. The wire harness 10 has a section S in which the form of the two electric wires 20 is the third form, between the first bending portion 10A and the second bending portion 10B.

According to this configuration, the form of the two electric wires 20 is the third form while no bending load is applied to the coupling portion 23. The third form is a form that appears at a midpoint during the switching of the form of the two electric wires 20 between the first form and the second form with the coupling portion 23 as a starting point. For this reason, it is possible to reduce the amount of deformation of the coupling portion 23 during switching from the third form to the first form, and to reduce the amount of deformation of the coupling portion 23 during switching from the third form to the second form. Accordingly, it is possible to suppress concentration of stress on the coupling portion 23.

Also, the wire harness 10 has the section S in which the two electric wires 20 are in the third form between the first bending portion 10A and the second bending portion 10B. For this reason, it is possible to suppress sharp deformation of the two electric wires 20 from the first bending portion 10A to the second bending portion 10B. Accordingly, it is possible to suppress concentration of stress on the electric wires 20.

(4) The coupling portion 23 has a weak portion 26 serving as a starting point from which the coupling portion 23 is bent and deformed.

According to this configuration, because the coupling portion 23 is easily bent and deformed with the weak portion 26 as a starting point, the work of switching the form of the two electric wires 20 between the first form and the second form becomes easy.

Further, at the first bending portion 10A and the second bending portion 10B, the coupling portion 23 is bent together with the two electric wires 20. Therefore, the work of collectively bending the two electric wires 20 in the first bending portion 10A and the work of collectively bending the two electric wires 20 in the second bending portion 10B are facilitated.

(5) The coupling portion 23 includes the thin portion 24 having a thickness smaller than the thickness of the electric wires 20, and the weak portion 26 is constituted by the thin portion 24.

According to this configuration, the weak portion 26 can be easily embodied by achieving an innovation in the shape of the coupling portion 23.

(6) The covering portions 22 and the coupling portion 23 are integrally molded using the same resin material.

According to this configuration, the configuration of the wire harness 10 is simplified.

Modifications

The present embodiment can be modified as follows. The present embodiment and the following modifications can be implemented in combination with each other as long as there is no technical contradiction.

The covering portions 22 and the coupling portion 23 may also be integrally molded using different resin materials. In this case, for example, the coupling portion 23 can be formed by performing insert-molding with the two electric wires 20. At this time, by using a material having lower bending rigidity than the covering portions 22 as the material of the coupling portion 23, the entire coupling portion 23 can be constituted as the weak portion 26. In this case, the thickness of the coupling portion 23 may also be the same as the thickness of the electric wires 20.

The thin portion 24 may also be formed by recessed portions provided on the two sides of the coupling portion 23 in the thickness direction.

The shape of the recessed portion 25 in a front view is not limited to an arc shape, and may also be, for example, a V-shape or a U-shape.

Figure 6:
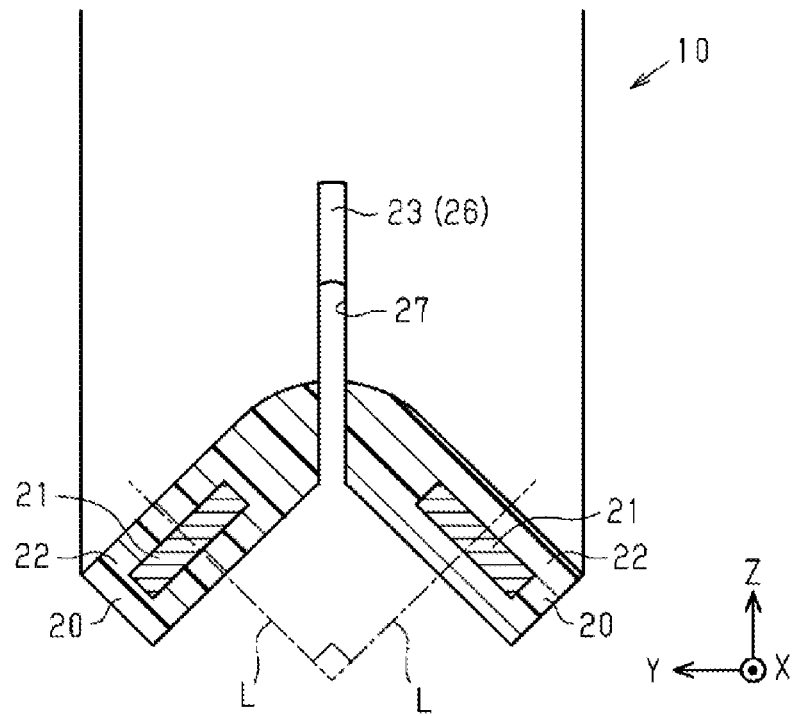
FIG. 6 is a cross-sectional view of a wire harness according to a modification.

As shown in FIG. 6, instead of the thin portion 24, a slit 27 extending in the longitudinal direction of the electric wires 20 may also be provided in a part of the coupling portion 23. In this case, a part including the slit 27 in the coupling portion 23 functions as the weak portion 26. Even with such a configuration, it is possible to achieve an effect similar to the above-described effect (4).

By omitting the recessed portion 25 from the coupling portion 23, the thin portion 24 can be omitted. In this case, the thickness of the electric wires 20 is the same as the thickness of the coupling portion 23. Even in this case, the coupling portion 23 is bendable between the first form, the second form, and the third form.

In the section S, the distance between the two electric wires 20 in the Y-axis direction increases as the electric wires 20 extend upward in the Z-axis direction.

The section S is not limited to a part of the wire harness 10 that is routed under the floor of the vehicle V. The section S may also be a part of the wire harness 10 that is routed inside the vehicle cabin. In this case, the first bending portion 10A and the second bending portion 10B may also be provided in the part routed in the vehicle cabin.

The angle formed by the two axes L in the third form may not be a right angle. The angle may also be, for example, an angle smaller than 90°, such as 80°, or an angle larger than 90°, such as 100°.

The form of the two electric wires 20 in the part of the routing path of the wire harness 10 routed under the floor of the vehicle V may also be the first form or the second form.

The form of the two electric wires 20 may also be the first form or the second form while no bending load is applied to the coupling portion 23. That is to say, in the wire harness 10, the covering portions 22 and the coupling portion 23 may also be integrally molded such that the form of the two electric wires 20 is either the first form or the second form.

In the first form, the axes L may not be parallel to each other. That is to say, the first form may also be a form in which the two core wires 21 are slightly inclined with respect to each other so that the two axes L intersect with each other on extension lines thereof.

In the second form, the axes L may not be parallel to each other. That is to say, the second form may also be a form in which the two core wires 21 are slightly inclined with respect to each other so that the two axes L intersect with each other on extension lines thereof.

The first form may be a form in which the entire ranges of the core wires 21 of the two electric wires 20 are parallel to each other in the width direction, or may also be a form in which parts of the core wires 21 of the two electric wires 20 are parallel to each other in the width direction.

The second form may be a form in which the entire ranges of the core wires 21 of the two electric wires 20 are parallel to each other in the thickness direction, or may also be a form in which parts of the core wires 21 of the two electric wires 20 are parallel to each other in the thickness direction.

The first bending portion 10A can be applied to a part that is to be bent in the Y-axis direction in the routing path of the wire harness 10. In this case, the width direction of the core wires 21 coincides with the Z-axis direction.

The second bending portion 10B can be applied to a part that is to be bent in the Z-axis direction in the routing path of the wire harness 10. In this case, the width direction of the core wires 21 coincides with the Y-axis direction.

The wire harness 10 electrically connects the inverter 1 and the high-voltage battery 2, but is not limited thereto. The wire harness 10 can be applied to a wire harness that electrically connects various electric devices installed in the vehicle V.

LIST OF REFERENCE NUMERALS

C1 Connector
C2 Connector
L Axis
S Section
V Vehicle
1 Inverter
2 High-voltage battery
10 Wire harness
10A First bending portion
10B Second bending portion
20 Electric wire
21 Core wire
22 Covering portion
23 Coupling portion
24 Thin portion
25 Recessed portion
26 Weak portion
27 Slit

What is claimed is:

1. A wire harness comprising:
two electric wires each including a core wire and an insulating covering portion that covers an outer circumferential surface of the core wire; and
a coupling portion that couples the covering portion of each of the two electric wires together while the two electric wires are arranged in parallel,
wherein a shape of a cross-section of the core wire of each of the two electric wires is a flattened shape in which a dimension in a thickness direction of the core wire is smaller than a dimension in a width direction of the core wire, the cross-section of the core wire of each of the two electric wires being orthogonal to a longitudinal direction of the core wire,
the coupling portion couples a part of the covering portion of each of the two electric wires together, the part of the covering portion covering an end portion of the core wire in the width direction of the core wire,
the coupling portion is bendable such that a form of the two electric wires is switched between a first form and a second form with the coupling portion as a starting point, the first form being defined by a state where the core wire of one of the two electric wires and the core wire of a remaining one of the two electric wires are parallel to each other in the width direction of the core wire of each of the two electric wires, and the second form being defined by a state where the core wire of one of the two electric wires and the core wire of a remaining one of the two electric wires are parallel to each other in the thickness direction of the core wire of each of the two electric wires, and
the wire harness further comprises:
a first bending portion in which the two electric wires are bent in the thickness direction of the core wire of each of the two electric wires in the first form; and
a second bending portion in which the two electric wires are bent in the thickness direction of the core wire of each of the two electric wires in the second form.

2. The wire harness according to claim 1,
wherein an axis of the core wire of one of the two electric wires and an axis of the core wire of a remaining one of the two electric wires extend in the thickness direction of the core wire of each of the two electric wires to be parallel to each other in both the first form and the second form.

3. The wire harness according to claim 1,
wherein the form of the two electric wires becomes a third form while no bending load acts on the coupling portion, the third form being defined by a state where the form of the two electric wires is in the middle of being switched between the first form and the second form with the coupling portion as the starting point, and
the wire harness has a section in which the form of the two electric wires is the third form, between the first bending portion and the second bending portion.

4. The wire harness according to claim 1,
wherein the coupling portion has a weak portion serving as the starting point from which the coupling portion is bent and deformed.

5. The wire harness according to claim 4,
wherein the coupling portion includes a thin portion having a thickness smaller than a thickness of each of the two electric wires, and
the weak portion is constituted by the thin portion.

6. The wire harness according to claim 1,
wherein the covering portion of each of the two electric wires and the coupling portion are integrally molded using a same resin material.

* * * * *